Figure 1:
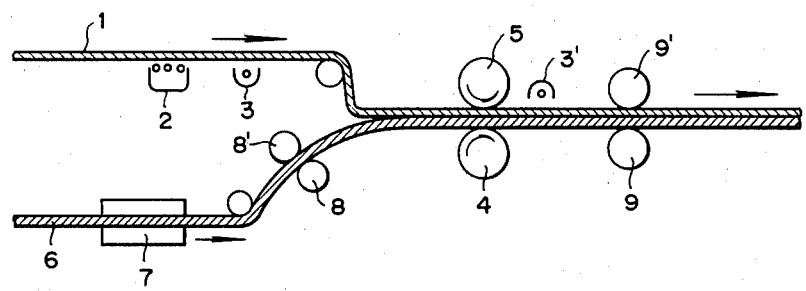

United States Patent [19]

Yoshida et al.

[11] 4,223,074

[45] Sep. 16, 1980

[54] PROCESS FOR PRODUCING METAL-BOEHEMITE LAMINATES

[75] Inventors: Risaburo Yoshida; Hidetoshi Nagata; Michihisa Naito; Keisuke Kaiho, all of Tokyo, Japan

[73] Assignee: Toyo Ink Manufacturing Co., Ltd., Tokyo, Japan

[21] Appl. No.: 780,147

[22] Filed: Mar. 22, 1977

[30] Foreign Application Priority Data

Mar. 29, 1976 [JP] Japan .................................. 51-33491

[51] Int. Cl.² .......................... B32B 15/20; C23F 7/06
[52] U.S. Cl. .................................... 428/469; 428/461; 428/539; 428/500; 426/126; 156/272; 156/306.3; 156/307.5; 156/331; 148/6.14 R; 148/6.27
[58] Field of Search .............. 428/458, 461, 474, 480, 428/409, 469, 472, 539, 500; 156/272, 306; 148/6.14 R, 6.27; 426/126

[56] References Cited

U.S. PATENT DOCUMENTS

| | | | |
|---|---|---|---|
| 3,380,860 | 4/1968 | Lipinski | 148/6.27 |
| 3,457,139 | 7/1969 | James | 428/461 |
| 3,563,785 | 2/1971 | Oga et al. | 428/461 X |
| 3,572,499 | 3/1971 | Mondano | 428/461 X |
| 3,770,122 | 11/1973 | Thiele | 206/84 |
| 3,890,109 | 6/1975 | Jones | 428/469 |
| 3,892,058 | 7/1975 | Komatsu et al. | 428/461 X |
| 3,945,899 | 3/1976 | Nikaido | 428/469 |
| 4,009,312 | 2/1977 | Hayashi et al. | 428/354 X |
| 4,149,912 | 4/1979 | Craighead | 148/6.7 |

*Primary Examiner*—Ellis P. Robinson
*Attorney, Agent, or Firm*—Jordan and Hamburg

[57] ABSTRACT

A process for the production of a laminate which comprises laminating a boehmite- or pseudoboehmite-treated aluminum foil with an oxidation-treated polyolefin film with the treated surface of the foil facing to the treated surface of the film under heat and pressure without the use of binders for lamination. In one embodiment, the laminate so produced may be laminated with the same laminate with the treated surface of the foil of the former facing to the treated surface of the film of the latter, under heat and pressure, or it may be laminated on the aluminum foil side with a resin film, such as a polyester or polyamide film, with the use of a binder between the aluminum foil and the resin film.

20 Claims, 5 Drawing Figures

PROCESS FOR PRODUCING METAL-BOEHEMITE LAMINATES

This invention relates to a process for the formation of a laminate of an aluminum sheet or foil with a polyolefin film and more particularly to a process for forming such a laminate particularly suitable as heat sealable material for package of foodstuffs without the use of a binder for lamination, the laminate being very advantageous from the view-point of sanitation.

There have heretofore been marketed various laminates of aluminum sheets or foils with various synthetic resin films and, among others, laminates of aluminum sheets or foils with polyolefin films have recently been particularly noted and in increasingly great demand with the development of package of foodstuffs.

However, there was raised a problem as to the bond strength effected between a polyolefin film and a metal such as an aluminum sheet or foil (the sheet and foil being hereinafter referred to simply as "foil") since the polyolefin film has no polar groups.

In an attempt to effect a satisfactory bond between an aluminum foil and a polyolefin film, many efforts have been made to develop binders useful for bonding the aluminum foil to the polyolefin film, treat the polyolefin film for improvement thereof in receptivity for the aluminum foil, treat the aluminum foil for improvement thereof in receptivity for the polyolefin film, effect such development and treatments in combination and find other suitable means for the same purpose as above.

Treatments heretofore known for improving a polyolefin film and aluminum foil in bonding to each other include, as treatments for aluminum foil, a mechanical treatment with sand blast or the like, an etching treatment with an acid or alkali and a chemical film-forming treatment such as a treatment by anodic oxidation or with phosphoric or chromic acid, and include, as treatments for a polyolefin film, a treatment with air, oxygen or ozone, a treatment with radiation, a treatment with sulfuric acid-chromic acid, a treatment with maleic or like acid for graft copolymerization, a treatment by corona discharge, a treatment with flame, a treatment by ultraviolet radiation and a treatment for incorporating an inorganic filler in the film.

However, even the use of these known treatments in combination did not result in the production of laminates having satisfactory bond strength and, therefore, binders had to be used for lamination. The thus-produced laminates in which the binder is used are disadvantageous in that the binder will melt out of the laminates if they are made into bags and subjected to a high temperature treatment for sterilization or the like. The term "binder" in the specification is intended to be synonymous with "adhesive".

Various studies were made by the present inventors in attempts to find a process for bonding an aluminum foil and a polyolefin film securely to each other without the use of a binder and, as a result of their studies, it has been found that even if an aluminum foil having been subjected to known boehmite treatment (such foil being hereinafter referred to as "boehmite-treated foil") is attempted to be laminated with a polyolefin film at a high temperature under pressure in a long time, a laminate having sufficient bond strength will not be obtained (a secure bond will not be effected between the boehmite-treated aluminum foil and the polyolefin film depending upon the kind of the polyolefin whereby are raised problems as to the operation of lamination and use of the laminates produced).

As a result of their further studies, the present inventors have also found that if a boehmite-treated aluminum foil is laminated with a polyolefin film having previously been subjected to oxidation treatment, a satisfactory laminate having high bond strength (a laminate in which the aluminum foil and the polyolefin film are securely bonded to each other) will be produced under heat and pressure in a short time. Such laminates may be used as material for packaging general goods and medical supplies, particularly for packaging foodstuffs.

The boehmite treatment effected in the practice of this invention may comprise (1) immersing an aluminum foil in a distilled water or ion exchange water at not lower than 60° C. to which a small amount of ammonia water, triethanolamine or the like may be added, (2) treating an aluminum foil in steam at 100°–140° C. or (3) subjecting an aluminum foil to any of other known methods for boehmite treatment.

The polyethylene films which may be used in the invention include commercially available films such as high-density, medium-density and low-density polyethylene films, and stretched and non-stretched polypropylene films.

The corona discharge treatment used herein may be a usual one.

The lamination under heat and pressure (or the thermal pressure lamination) according to this invention will provide a laminate which has high bond strength without a binder and is suitable as material particularly for packaging foodstuffs, the laminate consisting of an oxidation-treated polyolefin film laminated to a boehmite- or pseudoboehmite-treated aluminum foil with the treated surface of the foil and that of the film facing to each other.

These and other objects will be apparent from the following description.

The aluminum foils (including sheets as previously defined) used herein are not required to be of special quality but may be commercially available untreated ones.

The boehmite or pseudoboehmite treatment used in this invention may be effected by the use of any one of heretofore known various methods. For example, it may be effected by immersing an aluminum foil in distilled water or ion exchange water at not lower than 60° C. or by blowing steam (at 100°–140° C.) against an aluminum foil. The time required for the boehmite treatment varies depending partly on a temperature for the treatment but it ranges from about 30 seconds to several hours, with from two minutes to 30 minutes being preferred for industrial purposes. In the practice of boehmite treatment used in this invention, it is not always necessary to make a perfect boehmite layer of an aluminum foil surface; on the other hand, it is enough to make the foil surface into pseudoboehmite even if the pseudoboehmite is one which has been formed in less than several minutes, since even the formation of such pseudoboehmite will result in the production of laminates having sufficient bond strength which are suitable for the purpose of this invention. For this it is considered that the process of this invention is a very advantageous one for industrial use. The term "boehmite and/or pseudoboehmite" is hereinafter referred to simply as "boehmite" for brevity. In the boehmite treatment, said distilled water or ion exchange water may be incorporated with ammonia or an amine such as triethanolamine to improve the resulting boehmite-treated aluminum foil in corrosion resistance.

The polyolefin films which may be used in this invention include polyethylene films, preferably high-density polyethylene films, and polypropylene films, preferably unstretched polypropylene films.

The oxidation treatment for these polyolefin films may be at least one of a corona discharge treatment, an ultraviolet radiation treatment, a glow discharge treatment, an electron beam radiation treatment, an ozone treatment, a flame treatment and a sulfuric acid-chromic acid treatment, among which the corona discharge treatment is particularly advantageous for the purpose of this invention since it is easy to carry out with safety, dose not cause aging of the polyolefin films, does not raise problems as to disposal of waste water and provides oxidation-treated polyolefin films capable of being securely bonded to boehmite-treated aluminum foils. The use of the corona discharge and ultraviolet radiation treatments in combination is very advantageous industrially since it will result in the production of satisfactory laminates under heat and pressure in a short time.

In the lamination of the boehmite-treated aluminum foil with the oxidation-treated polyolefin film, there are two cases where the treated polyolefin film is used in non-molten state and molten state, respectively. In the form case, commercially available polyolefin films may be used (after oxidation-treated if not so treated), and particularly oxidation treated high-density polyethylene and unstretched polypropylene films may preferably be used. It is advantageous that these treated polyethylene and polypropylene films may be laminated to the boehmite-treated aluminum foils by the use of a comparatively simple thermal pressure laminating apparatus and it is also desirable that the laminates so obtained may be used as material for packaging foodstuffs since they are excellent in heat resistance.

In the latter case, it is advantageous as compared with the former case that a better bond may be effected in the production laminates, while it is disadvantageous that the polyolefin films may, in some cases, be degraded in quality and that a complicated thermal pressure lamination apparatus be required for lamination. Thus, it may be determined depending on the use of the resulting laminates which case to select.

In the lamination of the boehmite-treated aluminum foil with the oxidation-treated polyolefin film according to this invention, a hot press or rolls for thermal pressure lamination (hereinafter referred to simply as "lamination rolls") may be used with the latter being preferably used for industrial use. It is desirable that the lamination rolls be operated under the conditions that the temperature of the surface of the rolls is in the range of 140°–240° C., the pressure exerted by the rolls is in the range of 1–10 kg/cm² (in terms of a plane pressure) and the peripheral velocity of the rolls is in the range of 1–50 m/min.

Figure 2A:
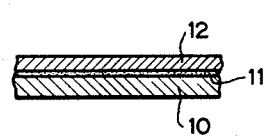
Figure 2B:
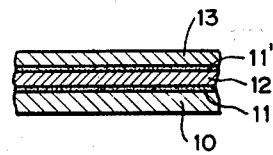
Figure 3A:
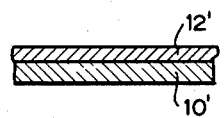
Figure 3B:
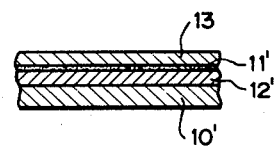
Figure 4:
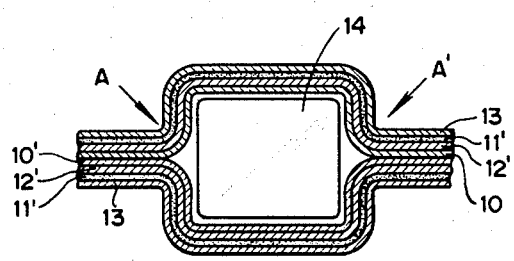
Figure 5:
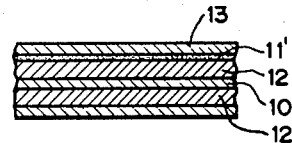

As apparatus for carrying out this invention, conventional apparatus for lamination using a binder under heat and pressure may be used although the step of applying a binder is omitted; for example, apparatus for extrusion lamination, for hot melt lamination or for dry lamination may be used. Such apparatus will be illustrated by reference to the accompanying drawing in which:

FIG. 1 illustrates a schematic view of an apparatus for carrying out a process of this invention; FIGS. 2(a) and 2(b) show a cross-sectional view of a conventional laminate;

FIGS. 3(a) and 3(b) show a cross-sectional view of a laminate produced by the process of this invention;

FIG. 4 shows a cross-sectional view of a laminate of this invention used for packaging; and FIG. 5 shows laminates of this invention in doubled form.

Referring now to FIG. 1, a polyolefin film 1 is subjected to at least one of oxidation treatments such as corona discharge treatment 2 and ultraviolet radiation treatment 3 and then passed to lamination rolls consisting of a heating roll 4 and pressure roll 5, while an aluminum foil 6 is subjected to boehmite treatment and passed, through heating rolls 8 and 8' if desired, to said lamination rolls where the boehmite-treated aluminum foil is laminated with the oxidation-treated polyolefin. If desired, the laminate so obtained is then subjected to ultraviolet radiation treatment 3' with the polyolefin film side facing to the radiation source or cooled by passing through cooling rolls 9 and 9'.

The use of the new laminates produced by the process of this invention as well as comparison of the new laminates with conventional (heretofore commercially available) ones will be detailed by reference to the accompany drawing.

As shown in FIG. 2(a), a conventional laminate consists of a polyolefin film 10 and an aluminum foil 12, laminated with each other with the use of a binder 11 therebetween and, as shown in FIG. 2(b), said laminate may be covered with another film 13 such as a polyester film or polyamide film with the use of a binder 11' such as an isocyanate type adhesive between the foil 12 and other film 13 in order to increase the strength of the laminate.

As shown in FIG. 3(a), a laminate produced by the process of this invention consists of an oxidation-treated polyolefin film 10' and a boehmite-treated aluminum foil 12', laminated with each other without the use of a binder therebetween. As shown in FIG. 3(b), the laminate is usually further laminated with a polyester or polyamide film 13 with the use of a binder between the foil 12' and the film 13 for use as packaging material.

As indicated in FIG. 4, the packaging material as shown in FIG. 3(b) is heat sealed at the ends A and A' with the polyolefin film 10' facing to goods 14 such as foodstuffs, contained in the packaging material prior to the heat sealing.

This invention will be better understood by the following Examples and Comparative examples, in which oxidation treatments were effected as follows:

| Corona discharge treatment: | 70–80 Kw<br>4000 cycle/sec<br>120 m/min (Film travelling speed) |
|---|---|
| Ultraviolet radiation treatment: | 10 2-Kw mercury lamps<br>Films passed at 120 m/min<br>10 cm below each of the lamps |
| Electron beam treatment: | 2 megarad, an instant (about 1 second) |
| Glow discharge treatment: | About 7Kw, 50m/min (Film travelling speed) |
| Flame treatment: | Films passed over the flame of a gas burner in 5/10,000 sec. |
| Sulfuric acid-chromic acid treatment: | |
| Composition { | Sulfuric acid 1500 parts<br>Potassium bichromate 75 parts |

-continued

| (parts by weight) | Water | 120 parts |
|---|---|---|
| | Immersed for just a moment (about 1 second). | |
| Ozone treatment: | Films passed at 100 m/min 10 cm below an ozone generator capable of generating 0.5 kg ozone/hr. | |

Comparative example 1

Aluminum foils (untreated, 15μ thick, soft, produced by Sun Aluminum Co., Ltd.), and treated aluminum foils obtained respectively by (1) anodically oxidizing an aluminum foil in a 15% aqueous solution of sulfuric acid for one minute (hereinafter called "treatment (1))" (2) anodically oxidizing an aluminum foil in 3% aqueous solution of oxalic acid for one minute (hereinafter called "treatment (2)", (3) immersing an aluminum foil in an aqueous solution at 60° C. of 65 g $HNO_3$, 80 g $NH_4HF_2$ and 0.1 g $Pb(NO_3)_2$ in one liter of water for two seconds (hereinafter called "treatment (3)") and (4) immersing an aluminum foil in aqueous solution at 100° C. of 500 g $H_3PO_4$ and 10 g $HNO_3$ in one liter of water for 6 seconds (hereinafter called "treatment (4)", were laminated respectively with untreated, corona discharge-treated, ultraviolet radiation-treated and flam-treated LDPE (low-density polyethylene films), HDPE (high-density polyethylene films) and CPP (unstretched polypropylene films) by the use of lamination rolls heated respectively to 140° C., 160° C., 180° C., 200° C. and 220° C. and rotated at a peripheral velocity of 1 m/min under a pressure of 2 kg/cm² in terms of a plane pressure, thereby to produce laminates. The laminates so produced were measured for peel strength by the use of a peel strength tester (produced under the trademark of TENSILON by Toyo Sokki Co., Ltd., Japan) and the results obtained are shown in Tables 1–3. The starting polyolefin films used herein were LDPE, 60–70μ thick, produced under the trademark of B'-5 by Tamapori Co., Ltd., HDPE, 60–70μ thick, produced under the trademark of DT-2 by Tamapori Co., Ltd., and CPP, 60–70μ thick, produced under the trademark of TORAYPHANE by Toray Co., Ltd.

In the following Tables, the term "treated" means "treated on at least one side of a foil or film". The numeral values represent "peel strength in g/cm" and the symbol "-" indicates "hardly bonded" in the Tables.

TABLE 1

| Treatment on aluminum | Treatment on LDPE | Lamination temp. | | | | |
|---|---|---|---|---|---|---|
| | | 140° C. | 160° C. | 180° C. | 200° C. | 220° C. |
| Untreated | Untreated | — | — | — | — | — |
| | Corona discharge | — | 60 | 70 | 180 | 190 |
| | Ultraviolet radiation | — | — | 60 | 70 | 170 |
| | Flame | — | — | 60 | 70 | 180 |
| Treatment (1) | Untreated | — | 190 | 200 | 240 | 250 |
| | Corona discharge | — | 250 | 260 | 270 | 280 |
| | Ultraviolet radiation | — | 230 | 250 | 250 | 260 |
| | Flame | — | 230 | 240 | 240 | 260 |
| Treatment (2) | Untreated | — | 190 | 200 | 240 | 250 |
| | Corona discharge | — | 240 | 260 | 270 | 280 |
| | Ultraviolet radiation | — | 240 | 240 | 240 | 260 |
| | Flame | — | 230 | 240 | 240 | 260 |
| Treatment (3) | Untreated | — | — | — | 230 | 230 |
| | Corona discharge | — | 90 | 200 | 260 | 270 |
| | Ultraviolet radiation | — | — | 180 | 200 | 230 |
| | Flame | — | — | 180 | 200 | 230 |
| Treatment (4) | Untreated | — | — | — | 230 | 230 |
| | Corona discharge | — | 90 | 200 | 260 | 270 |
| | Ultraviolet radiation | — | — | 180 | 200 | 230 |
| | Flame | — | — | 180 | 200 | 230 |

TABLE 2

| Treatment on aluminum | Treatment on HDPE | Lamination temp. | | | | |
|---|---|---|---|---|---|---|
| | | 140° C. | 160° C. | 180° C. | 200° C. | 220° C. |
| Untreated | Untreated | — | — | — | — | — |
| | Corona discharge | — | — | — | 50 | 50 |
| | Ultraviolet radiation | — | — | — | — | — |
| | Flame | — | — | — | — | — |
| Treatment (1) | Untreated | — | — | — | — | — |
| | Corona discharge | — | 100 | 100 | 130 | 130 |
| | Ultraviolet radiation | — | — | 100 | 100 | 100 |
| | Flame | — | — | 100 | 100 | 100 |
| Treatment (2) | Untreated | — | — | — | — | — |
| | Corona discharge | — | 100 | 100 | 130 | 130 |
| | Ultraviolet radiation | — | — | 100 | 100 | 110 |
| | Flame | — | — | 100 | 100 | 110 |
| Treatment (3) | Untreated | — | — | — | — | — |
| | Corona discharge | — | — | 60 | 60 | 70 |
| | Ultraviolet radiation | — | — | 50 | 50 | 60 |
| | Flame | — | — | 50 | 50 | 60 |
| Treatment (4) | Untreated | — | — | — | — | — |
| | Corona discharge | — | — | 50 | 60 | 80 |
| | Ultraviolet radiation | — | — | 50 | 50 | 50 |

TABLE 2-continued

| Treatment on aluminum | Treatment on HDPE | Lamination temp. | | | | |
|---|---|---|---|---|---|---|
| | | 140° C. | 160° C. | 180° C. | 200° C. | 220° C. |
| | Flame | — | — | 50 | 60 | 60 |

TABLE 3

| Treatment on aluminum | Treatment on CPP | Lamination temp. | | | | |
|---|---|---|---|---|---|---|
| | | 140° C. | 160° C. | 180° C. | 200° C. | 220° C. |
| untreated | Untreated | — | — | — | — | — |
| | Corona discharge | — | — | — | 50 | 50 |
| | Ultraviolet radiation | — | — | — | 30 | 30 |
| | Flame | — | — | — | — | — |
| Treatment (1) | Untreated | — | — | — | — | — |
| | Corona discharge | — | 100 | 100 | 130 | 130 |
| | Ultraviolet radiation | — | — | 110 | 110 | 110 |
| | Flame | — | — | 100 | 100 | 110 |
| Treatment (2) | Untreated | — | — | — | — | — |
| | Corona discharge | — | 100 | 100 | 130 | 130 |
| | Ultraviolet radiation | — | — | 100 | 110 | 120 |
| | Flame | — | — | 100 | 100 | 120 |
| Treatment (3) | Untreated | — | — | — | — | — |
| | Corona discharge | — | — | 50 | 60 | 80 |
| | Ultraviolet radiation | — | — | 60 | 60 | 70 |
| | Flame | — | — | 50 | 50 | 60 |
| Treatment (4) | Untreated | — | — | — | — | — |
| | Corona discharge | — | — | 50 | 60 | 80 |
| | Ultraviolet radiation | — | — | 50 | 50 | 70 |
| | Flame | — | — | 50 | 60 | 70 |

Comparative example 2

Aluminum foils were subjected to boehmite treatment by being immersed in ion exchange (deionized) water at 100° C. for 10, 5, 3 and 2 minutes, respectively. The treated aluminum foils were then laminated on the boehmite-treated surface with LDPE, HDPE and CPP at 140° C., 160° C., 180° C., 200° C. and 220° C., respectively, by the use of lamination rolls rotating at a peripheral velocity of 1 m/min under a pressure of 2 kg/cm² in terms of a plane pressure thereby to obtain laminates. Each of the laminates so obtained was measured for peel strength with the results being shown in Table 4.

TABLE 4

| Time required for boehmite treatment of aluminum | Poly-Olefin used | Lamination temp. | | | | |
|---|---|---|---|---|---|---|
| | | 140° C. | 160° C. | 180° C. | 200° C. | 220° C. |
| 10 min. | L D P E | 240 | 230 | 280 | 330 | 350 |
| 5 min. | | 250 | 240 | 270 | 300 | 330 |
| 3 min. | | 180 | 220 | 260 | 290 | 300 |
| 2 min. | | 110 | 170 | 240 | 290 | 300 |
| 10 min. | H D P E | 160 | 160 | 170 | 170 | 190 |
| 5 min. | | 90 | 160 | 170 | 170 | 170 |
| 3 min. | | 120 | 150 | 150 | 160 | 160 |
| 2 min. | | 120 | 120 | 140 | 160 | 160 |
| 10 min. | C P P | — | 200 | 210 | 210 | 220 |
| 5 min. | | — | 200 | 200 | 210 | 220 |
| 3 min. | | — | 180 | 180 | 180 | 190 |
| 2 min. | | — | 140 | 150 | 160 | 170 |

EXAMPLE 1

Aluminum foils were immersed in ion exchange water (deionized water) at 100° C. for 10, 5, 3 and 2 minutes in order to effect boehmite treatment thereon, respectively. The aluminum foils so treated were laminated with corona discharge-treated LDPE, HDPE and CPP with the treated surface of the foil facing to the treated surface of the film at 140° C., 160° C., 180° C., 200° C. and 220° C., respectively, by the use of lamination rolls rotating at a peripheral velocity of 1 m/min under a pressure of 2 kg/cm² in terms of a plane pressure thereby to obtain laminates. The laminates so obtained were measured for peel strength with the results being indicated in the following Table 5.

TABLE 5

| Time required for boehmite treatment of aluminum | Poly-olefin used | Lamination temp. | | | | |
|---|---|---|---|---|---|---|
| | | 140° C. | 160° C. | 180° C. | 200° C. | 220° C. |
| 10 min. | L D P E | 390 | 470 | 510 | 530 | 530 |
| 5 min. | | 370 | 370 | 380 | 420 | 430 |
| 3 min. | | 310 | 330 | 370 | 450 | 460 |
| 2 min. | | 300 | 320 | 330 | 340 | 350 |
| 10 min. | H D P E | 520 | 600 | 620 | 630 | 630 |
| 5 min. | | 510 | 580 | 600 | 620 | 620 |
| 3 min. | | 320 | 500 | 510 | 540 | 550 |
| 2 min. | | 230 | 360 | 410 | 420 | 430 |
| 10 min. | C P P | 60 | 580 | 630 | 640 | 630 |
| 5 min. | | 70 | 600 | 640 | 630 | 640 |
| 3 min. | | 60 | 530 | 530 | 590 | 600 |
| 2 min. | | 60 | 370 | 460 | 470 | 480 |

EXAMPLE 2

Aluminum foils were subjected to boehmite treatment by immersing them in ion exchange water at 100° C. for 3 minutes. The aluminum foils so treated were then laminated respectively with corona discharge-treated and ultraviolet radiation-treated LDPE, HDPE and CPP with the treated surface of the foil facing to the treated surface of the film, in the same manner as in Example 1 thereby yielding laminates. The laminates so yielded were then measured for peel strength with the results being indicated in Table 6.

EXAMPLE 3

Aluminum foils were subjected to boehmite treatment by immersing them in ion exchange water at 100° C. for 3 minutes. The boehmite-treated aluminum foils were laminated respectively with corona discharge-treated LDPE, HDPE and CPP with the treated surface of the foil and that of the film facing to each other, under the same heat and pressure as in Example 1 to yield laminates which were then subjected to ultraviolet radiation, thereby to obtain final laminates the peel strength of each of which is shown in Table 7.

TABLE 6

| Polyolefin used | Lamination temp. | | | | |
|---|---|---|---|---|---|
| | 140° C. | 160° C. | 180° C. | 200° C. | 220° C. |
| L D P E | 360 | 380 | 390 | 480 | 490 |
| H D P E | 350 | 530 | 550 | 580 | 580 |
| C P P | 130 | 580 | 580 | 630 | 640 |

TABLE 7

| Polyolefin used | Lamination temp. | | | | |
|---|---|---|---|---|---|
| | 140° C. | 160° C. | 180° C. | 200° C. | 220° C. |
| H D P E | 500 | 700 | 700 | 740 | 740 |
| C P P | 380 | 630 | 730 | 780 | 800 |

EXAMPLE 4

Aluminum foils were subjected to boehmite treatment by immersing them in ion exchange water at 100° C. for 3 minutes. The boehmite-treated foils were then laminated respectively with corona discharge-treated HDPE and CPP with the treated surface of the foil and that of the film facing to each other, at 180° C. by the use of lamination rolls rotating respectively at peripheral velocities of 1 m/min, 2 m/min and 30 m/min under a pressure of 2 kg/cm² in terms of a plane pressure thereby to yield laminates the peel strength of each of which is shown in Table 8.

TABLE 8

| Polyolefin used | Peripheral velocity of roll | | |
|---|---|---|---|
| | 2m/min | 3m/min | 30m/min |
| H D P E | 510 | 510 | 470 |
| C P P | 530 | 530 | 500 |

EXAMPLE 5

Aluminum foils were subjected to boehmite treatment by immersing in ion exchange water at 100° C. for 5 minutes. The aluminum foils so treated were then laminated with ultraviolet radiation-treated, flame-treated and glow discharge-treated HDPE and CPP with the treated surface of the foil and that of the film facing to each other, respectively, in the same manner as in Example 1 thereby to obtain laminates the peel strength of each of which is shown in Table 9.

TABLE 9

| Polyolefin used | Treatment on polyolefin | Lamination temp. | | | | |
|---|---|---|---|---|---|---|
| | | 140° C. | 160° C. | 180° C. | 200° C. | 220° C. |
| H D P E | Ultraviolet radiation | 300 | 330 | 380 | 390 | 400 |
| | Flame | 310 | 320 | 370 | 390 | 390 |
| | Glow discharge | 320 | 340 | 380 | 380 | 400 |
| C P P | Ultraviolet radiation | — | 320 | 380 | 400 | 410 |
| | Flame | — | 320 | 370 | 380 | 390 |
| | Glow discharge | — | 350 | 370 | 390 | 410 |

EXAMPLE 6

Aluminum foils were subjected to boehmite treatment by immersing them in ion exchange water at 100° C. for 3 minutes. The boehmite-treated aluminum foils were then laminated with corona discharge-treated HDPE and CPP with the treated surface of the foil and that of the film facing to each other, respectively, in the same manner as in Example 1, thereby obtaining laminates having the respective peel strengths as shown in Table 10.

TABLE 10

| Polyolefin used | Lamination temp. | | | | |
|---|---|---|---|---|---|
| | 140° C. | 160° C. | 180° C. | 200° C. | 220° C. |
| H D P E | 320 | 500 | 500 | 540 | 540 |
| C P P | 70 | 590 | 640 | 640 | 640 |

Some of the laminates so obtained were immersed in boiling water for 60 minutes and then measured for peel strength in order to find changes in peel strength. The remaining laminates were made into bags which were packed, in vacuo, respectively with water, a mixture of water and a salad oil in the ratio of 1:1 and curry. The bags so packed were allowed to stand in steam under pressure for 50 minutes, cooled, visually observed and then measured for peel strength with the results being indicated in Table 11.

TABLE 11

| Polyethylene used and Test condition | Lamination temp. | | | | |
|---|---|---|---|---|---|
| | 140° C. | 160° C. | 180° C. | 200° C. | 220° C. |
| H D P E | | | | | |
| Boiling water test | 320 | 500 | 500 | 540 | 540 |
| Packed with water | 300 | 480 | 480 | 520 | 530 |
| Packed with water and salad oil | 290 | 440 | 440 | 480 | 490 |
| Packed with curry | 300 | 460 | 460 | 510 | 520 |
| C P P | | | | | |
| Boiling water test | 70 | 590 | 640 | 640 | 640 |
| Packed with water | — | 570 | 620 | 620 | 620 |
| Packed with water and salad oil | — | 530 | 580 | 590 | 590 |
| Packed with curry | — | 560 | 610 | 610 | 610 |

EXAMPLE 7

Laminates were produced in the same manner as in Example 6. The laminates so produced were measured for permeability to oxygen by the use of an oxygen permeability tester (produced under the trademark O$_x$-Tran 100 type by Nissei Sangyo Co., Ltd.) with the result that each of them exhibited 0 cc/m²/24 hr atm.

EXAMPLE 8

Laminates were prepared in the same manner as in Example 6. The laminates so prepared were measured for permeability to moisture by the use of an infra-red automatic moisture permeability tester (produced under the trademark of IRD-2C type by Nissei Sangyo Co., Ltd.) with the result that each of them exhibited 0 g/m²/24 hr atm.

What is claimed is:

1. A process for the production of a laminate, comprising laminating a boehmite- or pseudoboehmite-treated aluminum foil with an oxidation-treated polyolefin film with the treated surface of the foil facing to the treated surface of the film, under heat and pressure to produce the laminate without the use of binders for lamination.

2. A process according to claim 1, wherein the oxidation-treated polyolefin film is in molten state.

3. A process according to claim 1, wherein the oxidation-treated polyolefin film is in non-molten state.

4. A process according to claim 1, wherein the polyolefin film is a member selected from the group consisting of high-density polyethylene films and unstretched polypropylene films.

5. A process according to claim 2, wherein the polyolefin film is a member selected from the group consisting of high-density polyethylene films and unstretched polypropylene films.

6. A process according to claim 3, wherein the polyolefin film is a member selected from the group consisting of high-density polyethylene films and unstretched polypropylene films.

7. A process according to claim 1, wherein the oxidation-treated polyolefin film is a corona discharge-treated polyolefin film.

8. A process according to claim 1, wherein the oxidation-treated polyolefin film is a corona discharge-treated and ultraviolet radiation-treated polyolefin film.

9. A process according to claim 1, further comprising subjecting the laminate to ultraviolet radiation with the polyolefin film side facing to a source of the radiation.

10. A process for the production of a laminate, comprising laminating the laminate of claim 1 on the aluminum foil side with a cover selected from the group consisting of the same laminate as above and a polyamide film or a polyester film, with the use of an isocyanate type adhesive between the laminate of claim 1 and the cover.

11. A heat sealable laminate for packaging foodstuffs, comprising (1) an oxidation-treated polyolefin film selected from the group consisting of oxidation-treated high-density polyethylene films and unstretched polypropylene films and (2) an aluminum foil having at least one side beohmite-treated, the film (1) and the foil (2) being laminated with each other with the boehmite-treated surface of the foil (2) facing to the oxidation-treated surface of the film (1) under heat and pressure.

12. A heat sealable laminate according to claim 11, wherein the film (1) is in molten form during lamination.

13. A heat sealable laminate according to claim 11, wherein the film (1) is in non-molten form during lamination.

14. A heat sealable laminate according to claim 11, wherein the oxidation-treated polyolefin film is a corona discharge-treated polyolefin film.

15. A heat sealable laminate according to claim 11, wherein the oxidation-treated polyolefin film is a corona discharge-treated and ultraviolet radiation-treated polyolefin film.

16. A heat sealable laminate according to claim 11, wherein the oxidation-treated film (1) and the boehmite-treated foil (2) are subjected to ultraviolet radiation with the film (1) facing to a source of the ultraviolet radiation after they have been laminated with each other.

17. A process according to claim 1, wherein the heat at the surface of the rolls used to effect said laminating is in the range of 140°–240° C.

18. A process according to claim 1, wherein the the boehmite- or pseudoboehmite-treated aluminum foil is prepared by immersing aluminum foil in distilled or deionized water at not lower than 60° C. for a time sufficient to form a boehmite or pseudoboehmite layer thereon.

19. A process according to claim 18, wherein ammonia or an amine is added to the water.

20. A process according to claim 1, wherein the boehmite- or pseudoboehmite-treated aluminum foil is prepared by blowing steam at 100°–140° C. against aluminum foil for a time sufficient to form a boehmite or pseudoboehmite layer thereon.

* * * * *